Sept. 21, 1948.   P. M. HARDWICK   2,449,744
SWIVEL COUPLING
Filed May 14, 1946

Inventor:
Pierre M. Hardwick,
Attorney.

Patented Sept. 21, 1948

2,449,744

UNITED STATES PATENT OFFICE 2,449,744

SWIVEL COUPLING

Pierre M. Hardwick, Los Angeles, Calif.

Application May 14, 1946, Serial No. 669,487

2 Claims. (Cl. 285—97.9)

The present invention relates to swivel couplings and among its objects are to oppose or prevent the accidental detachment of the coupling elements while permitting of their relative rotary motion into adjustment in any required position; to provide for opposing or preventing relative detachment of the coupling elements in such a way that they are relatively annularly adjustable so that they cannot be separated or blown apart; to provide swivel couplings which function normally and yet may not be uncoupled; to provide a swivel coupling embodying the features indicated, and which is comparatively economical in construction, assembly and operation; and generally to provide an improved swivel coupling as will be hereinafter described.

Generally stated, the improved swivel comprises two relatively turnable tubular parts, of which each is constructed with inwardly directed flanges, and one of which also has an outwardly directed flange, packing arranged between the parts, there being space between the parts for the accommodation of the packing, the part having the outwardly extending flange constructed of metal which expands or stretches readily, so that after the packing has been put in place this part may be assembled and expanded along with its external flange into position in association with the mate flange on the other part.

The invention also comprises the improvements to be presently described and finally claimed. In the following description reference will be made to the accompanying drawing, forming part hereof and in which, Figure 1 is a central sectional view.

Figure 1:
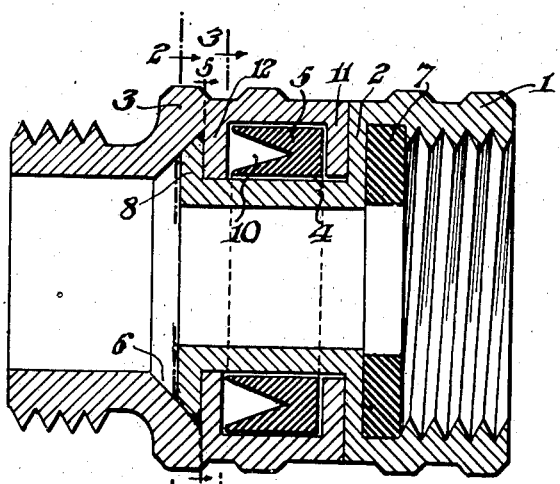
Figure 2:
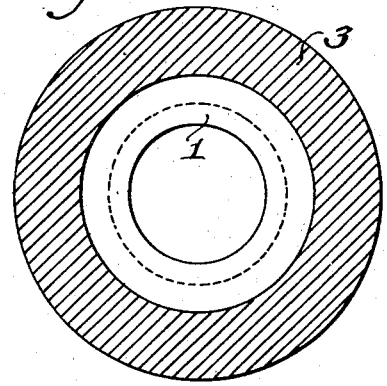
Fig. 2 is a transverse sectional view taken on the line 2—2 of Fig. 1.
Figure 4:
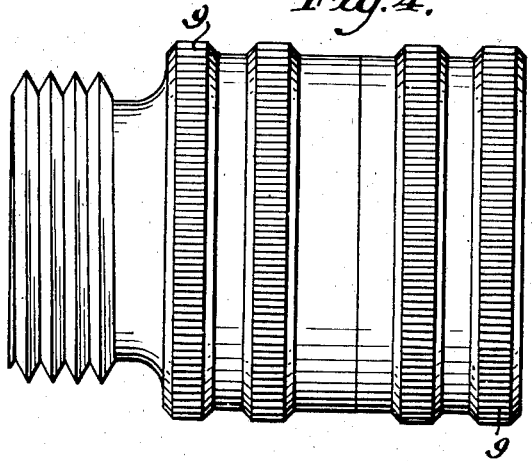
Fig. 4 is a side view of the coupling shown in Fig. 1.
Figure 3:
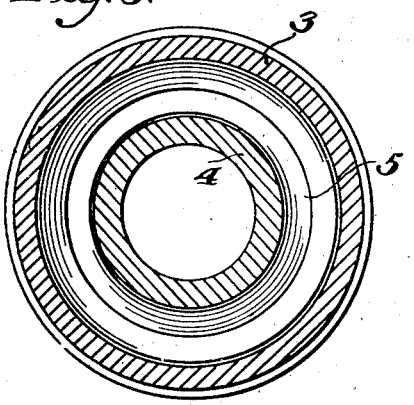
Fig. 3 is a transverse sectional view taken on the line 3—3 of Fig. 1.

Referring to the drawing, 1 and 3 indicate the parts of the coupling. The tubular part 1 is constructed of brass or of any other metal which can be expanded or stretched readily. The part 1 is shown as provided with an externally arranged flange 2. The part 3 is provided with internally arranged flanges 11 and 12. 4 is the inside flange which is turned in. The parts of the coupling are assembled by introducing the part 1 into the part 3 in proper relative position with the packing 5 interposed between them, by expanding the part 1 so that it interengages and connects the parts together. The part 1 may be expanded through the intervention of any appropriate expanding device, and thus the parts 1 and 3 may be and are permanently connected. As usual, the part 3 is provided with a ring-shaped three-sided cavity 10, in which the packing is mounted, so that the packing is confined by the part 3 on three sides, and by the part 1 at the other side. The space 6 provides clearance for flange 8. At one end of the coupling element there may be provided a washer or gasket 7 and the exterior of the coupling shown at the right in Fig. 4 is shown as roughened as at 9 or provided with flat faces so that it can be conveniently held by the hand or by means of a tool.

Figure 5:
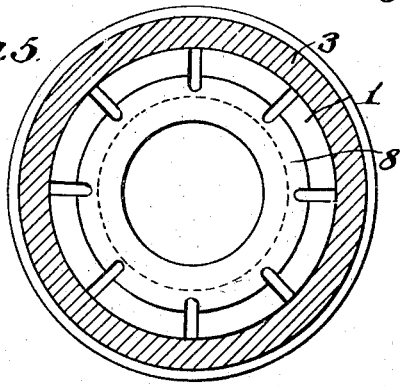
Fig. 5 is a view looking from left to right in Fig. 1 and taken on the line 5—5.

Referring to Fig. 5, the outwardly directed flange is shown as radially cut or slotted at intervals along its perimeter, so that the flange is in the form of segments of a flange instead of a full, solid flange. This segmental flange construction may not be necessary in all cases, but may in some cases be desirable.

It will be obvious to those skilled in the art to which the invention relates that modifications may be made in details of construction and arrangement without departing from the spirit of the invention which is not limited as to such matters or as to matters of mere form.

I claim:

1. In a swivel coupling, in combination, a tubular coupling element threaded at one end thereof and provided at its opposite end with a pair of longitudinally spaced inwardly projecting radial flanges forming an inwardly presenting gasket-receiving channel within said element, a second tubular coupling element telescoped within said first coupling element, said coupling members being adapted for relative rotation about the longitudinal axis of the coupling, means for securing said couplings against relative axial displacement including a pair of annular flanges and a longitudinally extending sleeve portion therebetween formed integrally on said second coupling element to provide an outwardly presenting channel within which said gasket-receiving channel is nested, and an expansible gasket disposed within the space formed between said nested channels.

2. In a swivel coupling of the character defined in claim 1 wherein said second coupling member is threaded at one end thereof and is provided at its opposite end with said outwardly presenting channel, and wherein the flange forming the end wall of said last-mentioned channel is expanded into position to effect nesting of said channels one within the other.

PIERRE M. HARDWICK.

REFERENCES CITED

The following references are of record in the file of this patent:

UNITED STATES PATENTS

| Number | Name | Date |
|--------|------|------|
| 590,532 | Stevens | Sept. 21, 1897 |
| 1,460,154 | Frazier | June 26, 1923 |